Jan. 29, 1963  N. HEPNER  3,075,403
ECCENTRIC COLLAR LOCKING DEVICE
Filed Aug. 30, 1960

INVENTOR.
NEAL HEPNER.
BY
Harry R. Dumont
ATTORNEY.

United States Patent Office 3,075,403
Patented Jan. 29, 1963

3,075,403
ECCENTRIC COLLAR LOCKING DEVICE
Neal Hepner, Birmingham, Mich., assignor to Burroughs Corporation, Detroit, Mich., a corporation of Michigan
Filed Aug. 30, 1960, Ser. No. 52,951
5 Claims. (Cl. 74—571)

This invention relates generally to an adjustable eccentric and more specifically to a locking device therefor.

It is an object of this invention to provide a new and improved locking means for an adjustable eccentric.

It is a further object to provide a locking means for an eccentric, which may be disengaged therefrom without substantially varying the preset location of the eccentric.

It is a still further object of this invention to provide a position locking means for an eccentric which may be engaged therewith without the eccentric being placed in a prealigned position.

Other objects of the invention will become apparent from the following detailed description taken in connection with the accompanying drawings, in which.

Figure 1:
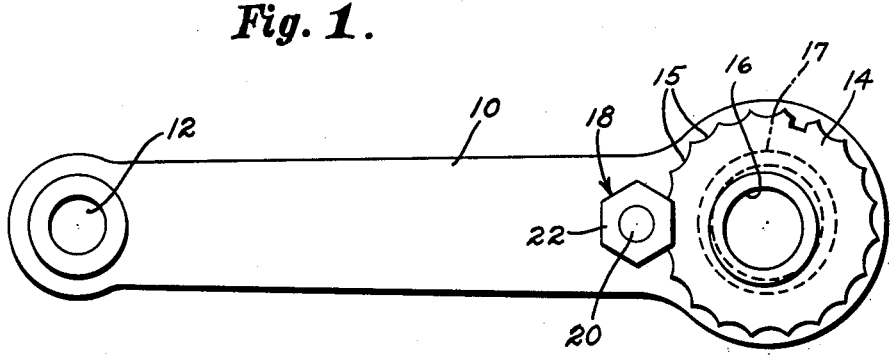
FIG. 1 is a top plan of a connecting arm showing the eccentric disk and locking device.

Referring to the drawings and, more particularly, FIG. 1, a link or connecting arm 10 of the type well known in the mechanical art is shown. At one end of the arm, opening 12 is provided for coupling to a driving or driven member. At the other end of the arm, an eccentric disc 14 is rotatably mounted. The disc has an eccentrically located opening 16 in a hub 17 and a series of like arcuate notches 15 terminating in cusps evenly distributed about its periphery. The locking member comprises a lock nut 18 mounted on a threaded stud 20 fixed to the arm and spaced from the periphery of the eccentric disc. As will readily be appreciated, rotation of the eccentric disc 14 serves to adjust the distances from opening 12 to opening 16 and consequently to vary the distances between members which may be fastened therein.

Figure 2:
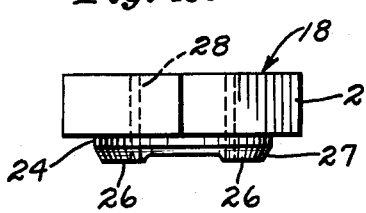
FIG. 2 is a detail of the locking nut.

FIG. 2 shows the detail of the structure of lock nut 18 which has a hexagonal head portion 22 at one end, a central cylindrical portion 24 reduced from said head portion and having a circular cross section complementary to the arcuate notches 15, and at its other end a plurality of projections 26, four in number in the presently described embodiment, which extend outwardly from the base of the nut in a longitudinal direction. Each projection 26 is in the form of a sector and has a chamfered or cam portion 27 about its outer periphery. An internal threaded portion 28 is provided to mate with a threaded stud 20 whereby the lock nut 18 may be raised or lowered.

Figure 3:
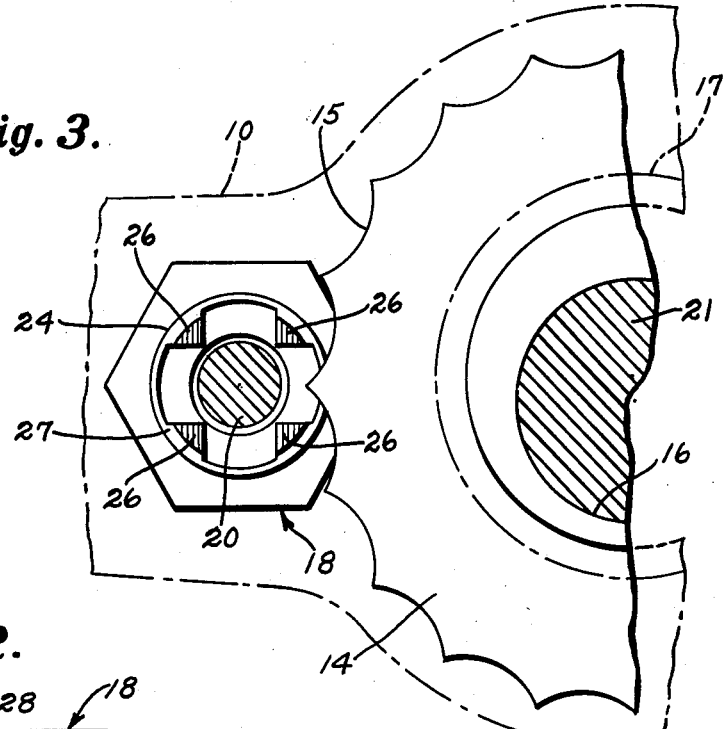
FIG. 3 is a bottom plan view showing the locking nut and a portion of the eccentric disk.

FIG. 3 shows the projections 26 in a position of maximum misalignment preparatory to registration of the locking nut with one of the notches 15 in the periphery of disc 14. A shaft 21 is shown journalled in the opening 16 in disc 14. Rotation of the nut 18 in a counterclockwise manner will advance the nut on the threaded stud 20 whereby the leading edge surface on a projection 26, adjacent the disc, engages the surface of the arcuate notch, in proximity thereto and rotates the disc 14. When the disc has been rotated a distance less than one notch, and the final camming action of cam portion 27 has occurred, the resultant registration of cylindrical portion 24 with the notch 15 will permit further tightening of the nut into a locked position. It will be noted that the concave outline of the notch 15 complements that of the peripheral outline of the central portion 24 so that, once registration is accomplished by the camming action of the projections upon the arcuate surface adjacent the cusp, additional tightening or subsequent loosening of the lock nut will not displace the eccentric disc from its predetermined setting.

It will be seen, by reason of the novel construction and arrangement of the eccentric disc and locking member, that a number of advantageous results are attained. It is possible to loosen the locking nut 18 without causing the eccentric disc 14 to be displaced. It is likewise possible to set the eccentric disc and to tighten the lock nut without first visually aligning the lock nut with the disc so that its central cylindrical portion 24 falls into a notch 15 of the disc. The degree of accuracy to which the disc's preset location may be maintained during tightening of the locking member may be directly controlled by the number of notches and size of the central cylindrical portion of the locking nut. It is also clear that the present invention enables ready adjustment and positive locking of an eccentric disc even in relatively inaccessible locations in a machine where the parts may not be manipulable to align the locking device with the disc.

Although applicant's invention is, for purposes of illustration, shown as embodied at one end of a link or arm, it is obvious that applicant's locking member is appropriate for use with an adjustable eccentric disc having arcuate notches around its periphery in any situation where such eccentrics are used. Such situations include, of course, the use of eccentrics in the journaling of shafts in the frames of machines or in plates within machines.

What is claimed is:

1. A locking member for an eccentric adjusting disc having a plurality of circumferentially extending arcuate notches comprising a head portion, a reduced central cylindrical portion having a circular cross section complementary to said arcuate notches and an indexing end portion operable to register an adjacent one of said notches with said cylindrical portion, said indexing end portion including a plurality of longitudinally extending like projections equally spaced about its periphery each having a leading edge on a side thereof and a camming surface adjacent said leading edge, said edge being adapted to engage an inner surface of a notch adjacent thereto, and thereby rotate said disc, and said camming surface being adapted to direct said notch into registration with said central portion.

2. A locking member as claimed in claim 1 in which said extending projections have leading edges on opposite sides thereof and a continuous camming surface between said edges.

3. An eccentric for adjusting the length of a connecting arm comprising a disc rotatably mounted on said arm, said disc having an off-set circular opening therein and a plurality of circumferentially extending arcuate notches, a locking nut, a threaded stud for mounting said locking nut fixed to said arm proximate and outside the periphery of said disc, said locking nut having a head portion, a cylindrical central portion having a circular cross section of substantially the same radius as said arcuate notches, and an end portion comprising a plurality of like longitudinally extending projections each having a leading edge surface and a cam surface operable to engage and rotate said disc to place an adjacent one of said notches into registration with said central portion of said locking nut.

4. A device for varying the position of an aperture with respect to an opening in a surface comprising an eccentric disc rotatably mounted on said surface and having a plurality of circumferentially extending arcuate cuspidated notches, an aperture in said eccentric disc offset from the center thereof and always aligned with said opening, a threaded stud fixed to said surface juxtaposed said eccentric disc, and a lock nut mounted on said stud, said nut having a head portion, a reduced circular cross sectional central cylindrical portion, and an indexing end portion, said end portion having a plurality of projections equally spaced about its periphery and extending longitudinally therefrom, each of said projections having a leading edge surface for engaging an inner surface of the notch adjacent thereto and thereby rotating said eccentric and a camming surface for directing said notch into registration with said central portion.

5. A device for varying the position of an aperture with respect to an opening in a surface comprising an eccentric disc rotatably mounted above said opening in said surface and including a plurality of arcuate notches terminating in cusps equally spaced about its circumference, an aperture in said eccentric offset from the center thereof, said aperture being always aligned with said opening, a lock nut, a threaded stud fixed to said surface proximate the periphery of said disc for mounting said lock nut, said lock nut having a head portion, a reduced cylindrical central portion with a circular cross section complementary to said arcuate notches, and an end portion having a plurality of longitudinal projections each having leading edge surfaces and a camming surface therebetween for engaging and rotating an adjacent notch of said eccentric into registration with said central portion.

References Cited in the file of this patent
UNITED STATES PATENTS

| | | |
|---|---|---|
| 1,208,350 | Moore | Dec. 12, 1916 |
| 1,596,000 | Crowell | Aug. 17, 1926 |
| 1,709,122 | Fouts | Apr. 16, 1929 |
| 1,779,981 | Nickerson | Oct. 28, 1930 |
| 1,858,709 | Johnson | May 17, 1932 |
| 1,974,729 | Wilcox | Sept. 25, 1934 |
| 2,265,222 | Benes | Dec. 9, 1941 |
| 2,477,587 | Doutt | Aug. 2, 1949 |

FOREIGN PATENTS

| | | |
|---|---|---|
| 575,552 | Great Britain | Feb. 22, 1946 |
| 729,838 | Great Britain | May 11, 1955 |